United States Patent
Banerjee et al.

(10) Patent No.: US 8,510,681 B2
(45) Date of Patent: Aug. 13, 2013

(54) RFID READER INTEGRATION TO VIRTUAL WORLD MONITORING

(75) Inventors: Dwip N. Banerjee, Austin, TX (US);
Sandeep R. Patil, Maharashtra (IN);
Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/171,540

(22) Filed: Jul. 11, 2008

(65) Prior Publication Data
US 2010/0011312 A1   Jan. 14, 2010

(51) Int. Cl.
*G06F 3/048* (2006.01)

(52) U.S. Cl.
USPC ............................... 715/850; 715/848

(58) Field of Classification Search
USPC .................. 715/772, 782, 766, 757, 848, 850
See application file for complete search history.

(56) References Cited

U.S. PATENT DOCUMENTS

| | | | | |
|---|---|---|---|---|
| 5,060,135 | A * | 10/1991 | Levine et al. | 715/769 |
| 6,026,376 | A * | 2/2000 | Kenney | 705/27 |
| 6,421,047 | B1 | 7/2002 | de Groot | |
| 6,580,441 | B2 * | 6/2003 | Schileru-Key | 715/805 |
| 6,941,184 | B2 | 9/2005 | Ebert | |
| 7,053,775 | B2 | 5/2006 | Moore | |
| 7,115,034 | B2 | 10/2006 | Kuwahara | |
| 7,151,454 | B2 | 12/2006 | Washington | |
| 7,181,690 | B1 | 2/2007 | Leahy et al. | |
| 7,259,778 | B2 * | 8/2007 | Arpa et al. | 348/139 |
| 7,260,553 | B2 * | 8/2007 | Ebert | 705/22 |
| 7,685,023 | B1 * | 3/2010 | Abraham et al. | 705/26 |
| 2002/0178072 | A1 * | 11/2002 | Gusler et al. | 705/26 |
| 2005/0273201 | A1 * | 12/2005 | Zukowski et al. | 700/258 |
| 2006/0087406 | A1 | 4/2006 | Willins et al. | |
| 2006/0178968 | A1 | 8/2006 | Jung et al. | |
| 2007/0211047 | A1 * | 9/2007 | Doan et al. | 345/419 |
| 2007/0283004 | A1 * | 12/2007 | Buehler | 709/224 |
| 2008/0059570 | A1 | 3/2008 | Bill | |
| 2008/0204233 | A1 * | 8/2008 | Agrawal et al. | 340/572.1 |

OTHER PUBLICATIONS

FQCODE; Warehouse Management; article; date: unknown; pp. 2; Fresh Quality Code; accessed from http://www.fqcode.com/eng__contenidos/warehouse.asp.

J. Mahmud, Y. W. Huang, J. Ponzo, R. Pollak; Building a Bridging System Between Web Applications and Virtual Worlds; article; date: Apr. 21-25, 2008; pp. 10; WWW 2008; Beijing, China.

W. Jiang, D. Yu, Y. Ma; A Tracking Algorithm in RFID Reader Network; article; date: Mar. 2006; pp. 8; IEEE Computer Society; Beijing, China.

(Continued)

*Primary Examiner* — William Bashore
*Assistant Examiner* — Gregory A Distefano
(74) *Attorney, Agent, or Firm* — David Mims; Robert C. Rolnik (57) ABSTRACT

Disclosed is a virtual world server receives an update signal corresponding to an RFID tag. The virtual world server determines an RFID tag identifier, an RFID reader identifier, and an associated asset name from the update. The virtual world server looks up a virtual area associated with the RFID reader identifier. The virtual world server teleports a virtual asset associated with the RFID tag identifier to a virtual area in the virtual world. The virtual world server renders a model of the asset in a virtual world based on an avatar perspective.

20 Claims, 5 Drawing Sheets

(56) References Cited

OTHER PUBLICATIONS

Second Places; Second Life Places by Second Places; article; date: 2007; pp. 3; Clicks and Links Limited and Fusion Unity Limited; accessed from:http://clicksandlinks.com/opencms/opencms/CL_Solutions/products/secondlife/places.html.

Second Life; Building; webpage; date: 2008; pp. 3; Linden Research; accessed from: http://secondlife.com/whatis/building.php.
Second Life; FAQ; webpage; date: 2008; pp. 3; Linden Research; accessed from: http://secondlife.com/whatis/faq.php.
Wikipedia; Radio-frequency identification; Wikipedia; Oct. 10, 2007.

* cited by examiner

RFID READER INTEGRATION TO VIRTUAL WORLD MONITORING

BACKGROUND OF THE INVENTION

1. Field of the Invention

The present invention relates generally to a computer implemented method, data processing system, and computer program product for tracking a moving inventory. More specifically, the present invention relates to modeling assets relative to electronically sensed position of such assets and presenting such assets in a virtual world that models features in the real world.

2. Description of the Related Art

Modern uses of networked computers leverage the graphics processing power of client computers. The client computer is a computer typically assigned the task of supporting user input and displaying output to a user. Many users reach online environments called virtual worlds by using a client computer. A virtual world permits a user to adopt an avatar or a graphical representation of the user. The user has the power to move the avatar, have the avatar interact with objects, and have the avatar interact with the avatars of other users.

A virtual world is the collection of all objects of the virtual world and the virtual areas, if any, associated with the objects. A virtual world may include simulation of object attributes, such as textures and sounds, as well as rules under which real-world physics are simulated or modified, all of which can be supported by a virtual world server. An object can model a real world item, or a prototype of a real world item. Accordingly, an object of the virtual world may be used to simulate solid, liquid, gas and combinations of these materials.

An example of an object is an avatar. An avatar is an object that represents a true-to-life or a fanciful depiction of a person. The avatar may be rendered in a manner used by the virtual world server to render other objects. In addition, an avatar may serve other functions in addition to those normally associated with an object. An avatar perspective is the combination of the avatar location and attitude. In addition, a perspective may be modified by a stance of the avatar. The viewport may include menus, controls, and messages associated with the viewport to provide information pertaining to the contents of the viewport and to allow user actions upon the viewport.

A virtual world depends on a coordinate system to create anchor points where avatars and objects may be located for purposes of rendering the avatars and objects to each user's computer. Coordinates are two or more units of distance that define a position in a virtual world. The coordinates may be a Cartesian set of points that define planes and altitudes, however, global coordinates also are known to be used. Typically, an object has a location referenced by a triplet of numbers, and optionally a region or other descriptor of a subset of space within the virtual world.

In addition to a location, proper rendering of an object or avatar may depend on an orientation or attitude of the object or avatar. An attitude is an overall orientation of an object or avatar in relation to a plane or a vector. For example, an attitude may be based on a number of degrees that an object is offset from a positive direction along a coordinate axis. For virtual worlds that form analogs to a real world, north and south compass points may correspond to a positive direction along a first axis and a negative direction along the axis. East and west may be represented in a similar manner, along a second axis perpendicular to the first axis. A third axis may correspond to height. Attitudes may also include offsets of inclination above a plane.

Some virtual worlds are organized to present an avatar within a three dimensional environment. Such virtual worlds may provide a "first person point of view." Within a first person point of view, a client computer renders scenery to a two dimensional screen to produce a three dimensional illusion or effect. An example of a three dimensional illusion includes diminishing the size of an object as the object becomes relatively distant from the avatar's position in the virtual world. Another example of a three dimensional illusion is displaying a nearer object as obscuring a more distant object. Each of these illusions is controlled by rendering rules. Rendering rules are a set of rules or steps that a client computer executes to display the two-dimensional image such that the display provides impressions of depth that users expect to see in real life scenery.

Many virtual worlds provide a user a teleport feature that permits a user to change an avatar location. The changed location causes a perspective of the avatar to change, and thus changes a screen image of the virtual world. The perspective may cause objects to be rendered to show the objects at different orientations and distances from the avatar. The perspective may cause formerly rendered objects to be obscured by other objects. Likewise, the perspective may cause formerly rendered objects to be so distant that the objects are not rendered in the second perspective. In this case, a client computer renders a new set of objects to the user's computer display screen.

Scenery and renderings may change in a virtual world in response to movements of objects within such a world. Avatars are a class of objects that move. Other objects may move, for example, virtual trees may move in response to a modeled wind, and virtual water may flow in response to modeling of gravity and fluid dynamics. Each object can be modeled to varying levels of complexity and detail according to the geometry provided to a data processing system, and a processing power of the data processing system. Typically, a virtual world server renders a scene in response to inputs made by users. For example, a first user that logs into a virtual world server may be presented a view that includes avatars that move in response to movements and commands given by users that each control one or more avatars in the virtual area that the user has entered.

In addition to advances in providing collectivized simulations of real environments in a virtual world, engineers have provided increasingly sophisticated ways to track inventory in the real world. For example, bar code is now giving way to marking assets with RFID tags. A radio frequency identifier (RFID) tag is a transponder that can respond to a radio frequency (RF) signal with a self-identifying signal. The transponder can be passive, active, or a combination of the two. The self-identifying signal can be globally unique, or unique as compared to asset of RFID tags used for an application. RFID tags are arranged in varying sizes and shapes including as small as a piece of chewing gum, and as flat as card stock. Consequently, RFID tags may be attached to a wide variety of assets.

SUMMARY OF THE INVENTION

The present invention provides a computer implemented method and apparatus to receive an update signal corresponding to an RFID tag. The virtual world server determines an RFID tag identifier, an RFID reader identifier, and an associated asset name from the update. The virtual world server looks up a virtual area associated with the RFID reader identifier. The virtual world server teleports a virtual asset associated with the RFID tag identifier to a virtual area in the virtual world. The virtual world server renders a model of the asset in a virtual world based on an avatar perspective.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
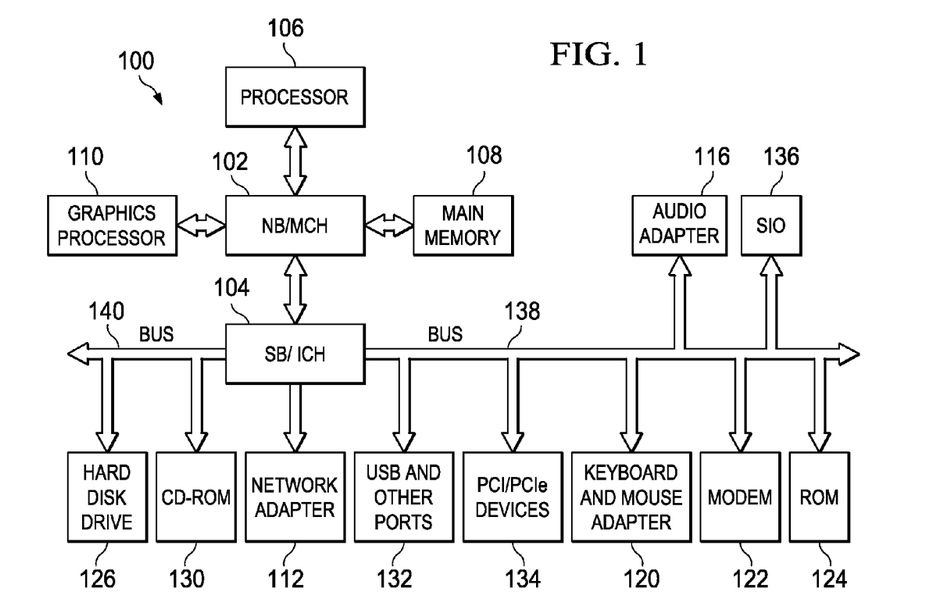
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable storage device(s) may be utilized. The computer-usable or computer-readable storage device may be, for example but not limited to, an electronic, magnetic, optical, electromagnetic, infrared, or semiconductor system, apparatus or device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer-usable or computer-readable storage device could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage device may be any medium that can contain or store, the program for use by or in connection with the instruction execution system, apparatus, or device. The computer usable program code may be transmitted using any appropriate medium, including but not limited to wireless, wireline, optical fiber cable, RF, etc. The term "computer-readable storage device" does not encompass a signal propagation media such as a copper cable, optical fiber or wireless transmission media.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for tracking virtual assets and presenting such virtual assets in a virtual area in a manner meaningful to a user. Such virtual assets may mimic the location and behavior of real-world counterpart assets. RFID tags, RFID readers and other infrastructure may permit a cohesive presentation of the real-world activities within a virtual environment such as provided by a virtual world server. Movements and status information may accordingly by rendered to a view within a display of a client computer.

The virtual world server may render each virtual asset or other object of a scene by animating the image of such objects. For example, a virtual asset such as a virtual cow can be located at a shed, another virtual asset. Activity in the real world may cause a real-world cow to move within a grazing area. Accordingly, a virtual world server embodiment may the virtual asset to move as though by walking from one location in the virtual world to the new location corresponding to the grazing area. The virtual world server may animate in other ways. For example, the virtual world server may cause an object to periodically be colored red to signal a condition or alert a user to a status. It can be appreciated, that many forms of animation are possible, and may provide some instructional value to students studying a subject. Animation can include showing the process by which a cow is milked or the manner in which a cow feeds. As can be appreciated, many animations are possible for a wide range of simulated or virtualized assets.

A further application of one or more embodiments includes, for example, an application of an illustrative embodiment of the invention may be to treat a population of deer as assets, once tagged with RFID tags. A hunter may also carry an RFID tag, and himself be an asset having a corresponding virtual asset in a virtual world. Thus, progress of a hunt may be monitored through a network of RFID readers in a physical area described in a virtual world.

Figure 2:
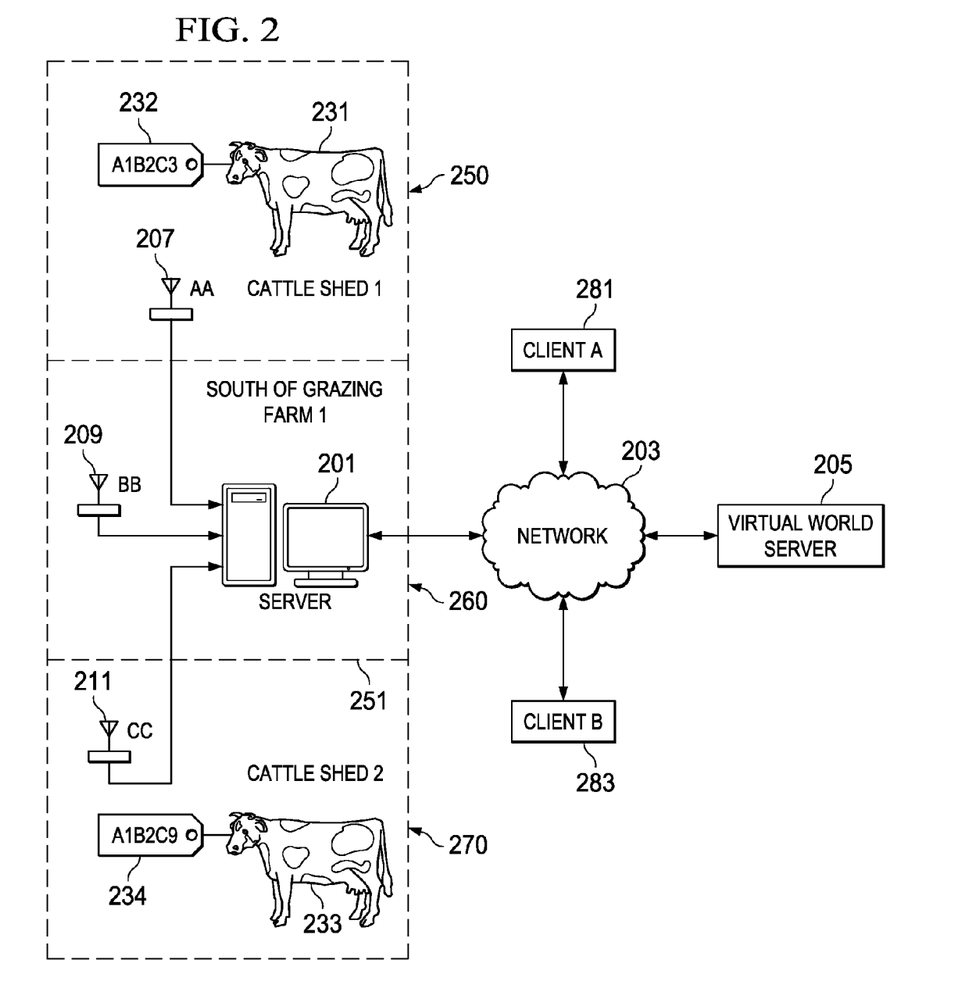
FIG. 2 shows a server interacting with computers hosting a virtual world server in accordance with an illustrative embodiment of the invention.

FIG. 2 shows a server interacting with computers hosting a virtual world server in accordance with an illustrative embodiment of the invention. The application of the embodiment is the tracking of movements of livestock animals, for example, cows in a dairy cattle herd. Distinct regions in a real world environment may be monitored for the movements of one or more cows, where an RFID tag is attached to each cow. A radio frequency identifier (RFID) tag is a transponder that can respond to a radio frequency (RF) signal with a self-identifying signal. The transponder can be passive, active, or a combination of the two. The self-identifying signal can be globally unique, or unique as compared to asset of RFID tags used for an application. RFID tags are arranged in varying sizes and shapes including as small as a piece of chewing gum, and flat as card stock. Consequently, RFID tags may be attached to a wide variety of assets.

Each RFID tag may have a unique RFID tag identifier. An RFID tag identifier is a digital identifier that may be modulated on a radio frequency carrier wave to identify an RFID tag. The RFID tag may be hard wired into the RFID tag, or alternatively, stored to a memory of the RFID tag.

The real-world environment of a dairy farm may be divided to several areas that can be monitored by RFID readers. An RFID reader is a device that can send an interrogation signal in radio frequencies, and receive, demodulate and decode one or more self-identifying signals sent from one or more RFID tags. The RFID reader may have an RFID reader identifier. The dairy farm, in this example, is divided into three regions, cattle shed 1 250, south of grazing farm 260, cattle shed 2 270. A boundary may divide two regions. One or more RFID readers, 207, 209, and 211 may monitor movements of cattle into each respective region. A border between regions may be border 251. For example, cow 233 may enter cattle shed 2 270. RFID reader 211 may issue an interrogate signal and receive a response from RFID tag 234, attached to cow 233. RFID reader 211 may transmit information including an RFID tag identifier, in this case 0xA1B2C9, to server 201.

An RFID reader may have a distinct RFID reader identifier. An RFID reader identifier is a number that is unique among RFID readers used for an application. The RFID reader can be expressed in hexadecimal, for example, 0xAA, 0xBB, and 0xCC. RFID reader 207 may similarly receive a response from RFID tag 232 attached to cow 231. RFID reader 207 and RFID reader 211 may transmit an update signal to server 201. The update signal may include the RFID tag identifier that an RFID reader received. In addition, the update signal may include an RFID reader identifier, which can be used to match the RFID tag to a corresponding geographic region within which the tag is located.

At this point, the data in the update signal is a highly abstract representation of real-world events. Accordingly, such signals can be confusing and otherwise lack meaning when presented in a raw digital form to a user, absent some embellishment. Nevertheless, such update signals are used to identify and track inventory. Further embellishment of signals can make the data more meaningful to a user.

A server is a data processing system, for example, data processing system 100 of FIG. 1. The server may respond to hypertext transport protocol (http) requests, and support various internet protocols. Server 201 may aggregate update signals and respond to queries transmitted via network 203. Such queries may originate with virtual world server 205. Nevertheless, server 201 may transmit update signals to virtual world server 205 as the update signals are received at server 201. Network 203 may be a packet switched network having links between nodes carried by media such as wire, fiber-optic cable, air, among others. Protocols to collect information at virtual world server 205 may include, for example, extensible markup language remote procedure call (XML-RPC) or http-request as the mode of communication, although it is appreciated that many other forms of coordinating collection of data may be used that is real-time or nearly real-time. In addition, one or more clients may monitor progress of the virtual world, and as such, receive updated position information from virtual world server 205. Client A 281 may be used by an owner of a dairy farm. A browser equipped to receive geometry data from the virtual world server may provide a rendered view showing perspective and shading of the virtual assets to provide an immersive sense of location of the various virtual assets in the virtual area. Similarly, client B 283, may be used by a customer or other interested party to view how a dairy farm operates. Client B 283 could be located in a home, a school, or any other location where curious people are located.

Figure 3A:
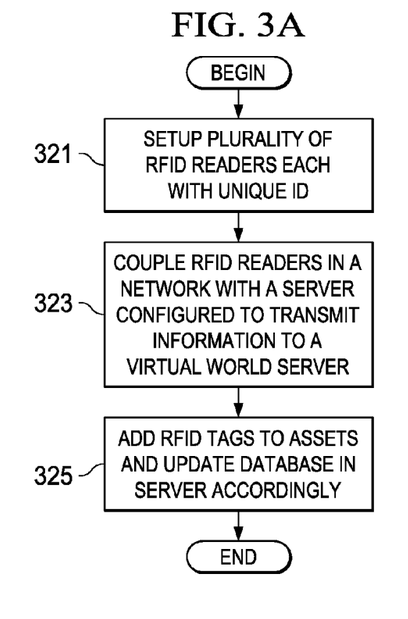
FIG. 3A is a flowchart of steps to set up a server in accordance with an illustrative embodiment of the invention.

FIG. 3A is a flowchart of steps to set up a server in accordance with an illustrative embodiment of the invention. A server may be server 203 of FIG. 2A. Initially, a system architect may setup a plurality of RFID readers, each with a unique identifier (step 321). Next, the system architect may couple the RFID readers in a network with a server configured to transmit information to a virtual world [sic] server (step 323). Finally, the system architect may add RFID tags to assets and update a database in a server accordingly (step 325). An asset is a real-world item that can be tagged with an RFID tag or transponder. The system architect may take additional steps in coordination with agencies that operate a virtual world server, for example, giving geometrical descriptions of assets and other attributes so that a virtual world server may apply such descriptions to provide a meaningful context. The use of geometrical descriptions in relation to virtual assets is described further below.

Figure 3B:
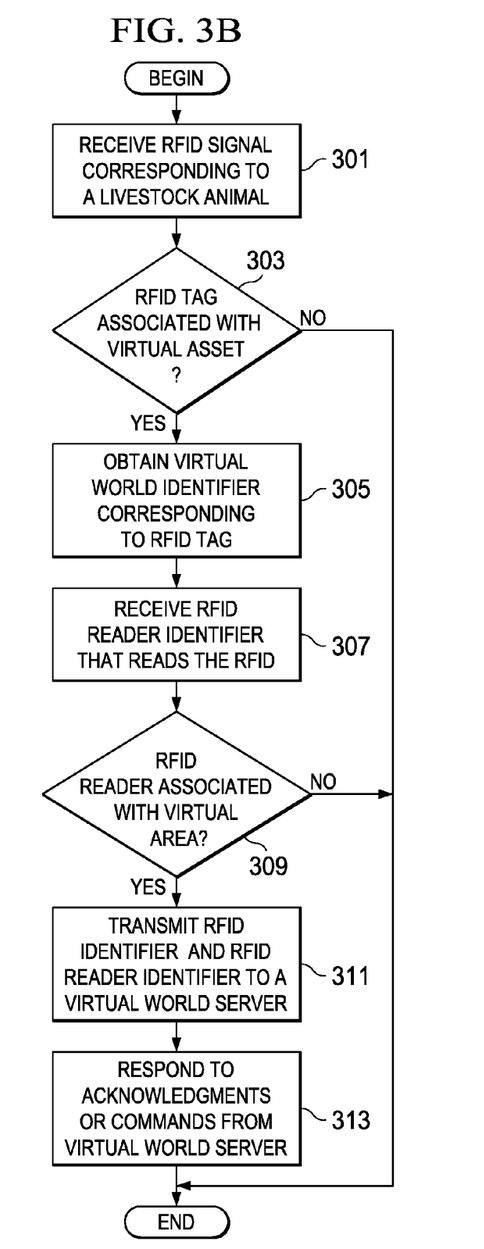
FIG. 3B is a flowchart of steps to collect livestock animal RFID tag identifiers in a server in accordance with an illustrative embodiment of the invention.

FIG. 3B is a flowchart of steps to collect livestock animal RFID tag identifiers in a server in accordance with an illustrative embodiment of the invention. Livestock animals are a form of asset. It is appreciated that assets other than livestock may be tracked using steps as described in FIG. 3B. Initially, server receives update signal corresponding to a livestock animal (step 301). Next, the server may determine whether an RFID tag identifier is associated with a virtual asset (step 303). Next, the server may obtain an identifier corresponding to RFID tag (step 305). Next, the server may obtain/receive an RFID reader identifier that read the RFID tag (step 307). Obtaining the RFID reader identifier may include storing a payload data from a packet received at step 301. The payload data of the RFID signal may include both an RFID reader identifier as well as one or more RFID tag identifiers.

Next, the server may determine if the RFID reader is associated with a virtual area (step 309). A virtual area is a volume in the virtual world served by one or more processors that render objects in the virtual world. If the RFID reader is associated with a virtual area, the server transmits an RFID tag identifier and RFID reader identifier to a virtual world server (step 311). Next, the server may respond to acknowledgments or commands from a virtual world server (step 313). For example, the server may re-send the RFID tag identifier and/or RFID reader identifier if the virtual world server indicated an error. A command, may be, for example, a command to control an electrical device, using, for example, using X10 home automation protocols, as well as factory automation protocols known in the art. An electrical device may be, for example, a lamp.

Figure 4:
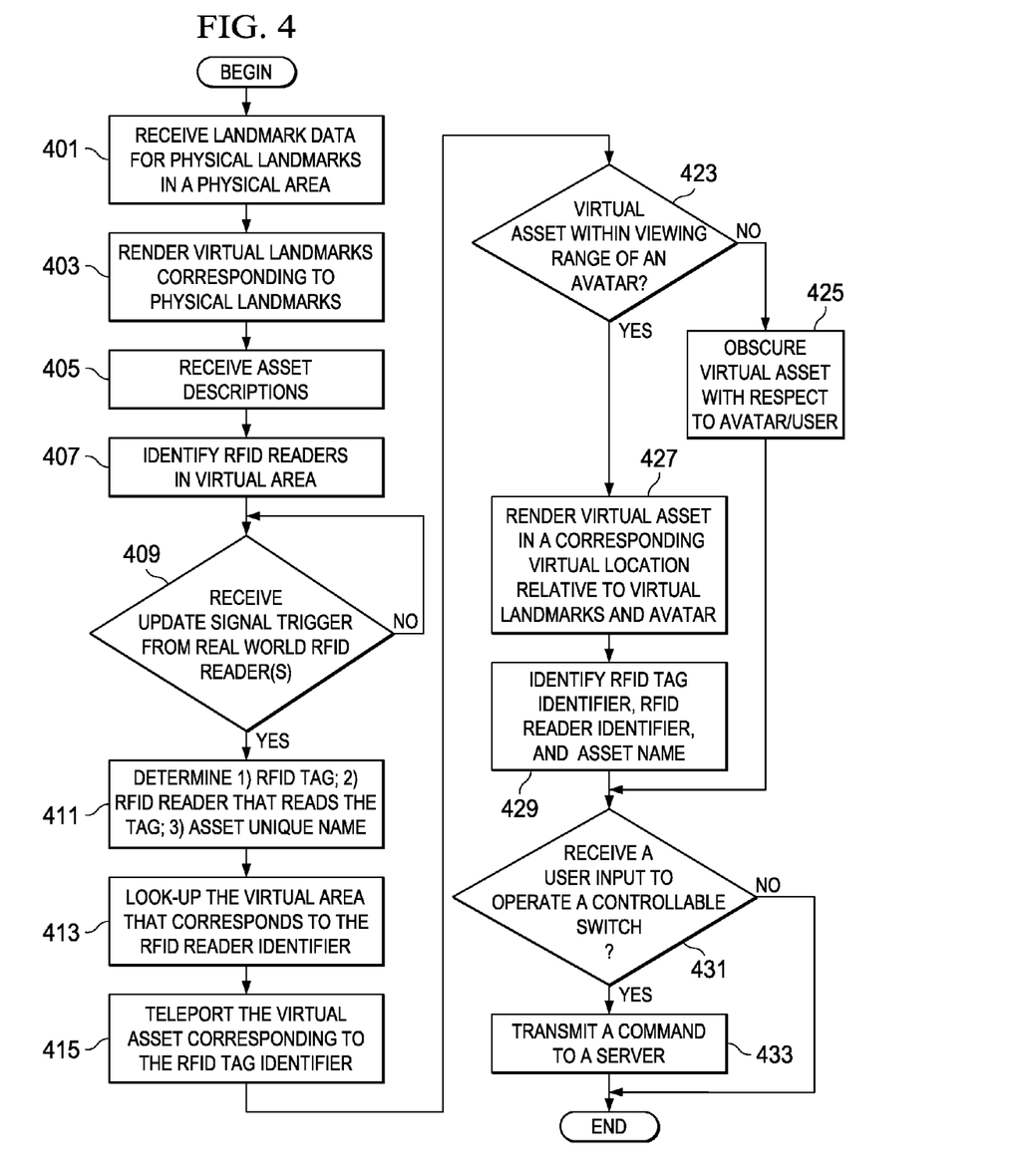
FIG. 4 is a flowchart of virtual world server responses to real world inputs in accordance with an illustrative embodiment of the invention.

FIG. 4 is a flowchart of virtual world server responses to real world inputs in accordance with an illustrative embodiment of the invention. Generally, a virtual world server may obtain real world inputs in two ways. A first way, is the collection of asset and landmark details, for example, geometry and locations of such objects. A second way is the real-time reception of location data, including RFID tag identifiers and RFID reader identifiers.

An initial phase of responding to real world inputs includes the virtual world server receiving landmark data for physical landmarks in a physical area (step 401). Landmark data is information concerning the geometry of terrain, physical qualities of soil, presence of moisture and other details that may comprise physical properties that may be modeled in a virtual world server. Landmark data can also include information about structures, plants and manufactured objects attached to terrain in a physical area.

Next, the virtual world server may render virtual landmarks corresponding to physical landmarks (step 403). Such a rendering can arrange the virtual landmarks to be in a similar size, orientation, and location as described by the physical landmark data that corresponds with each virtual landmark. Accordingly, the virtual world arrangement of virtual landmarks may mimic the arrangement, colors, and facades of the corresponding real-world objects and landmarks. Next, virtual world server may receive asset descriptions (step 405). This step can include, for example, geometric descriptions of cows, milking machines, among other assets. In addition, data concerning the relative positions of each RFID reader may be entered to a virtual world server. A description of a cow may serve as a prototype that can be re-used when rendering multiple instances of cows. Next, the virtual world processor identifies RFID readers in a virtual area that corresponds to the physical area (step 407). Identification may occur by matching in a table an RFID reader identifier with a virtual world object identifier.

The virtual world server may repeatedly respond to real-time data transmitted by a server, for example, server 201 of FIG. 2. Consequently, the virtual world server receives an update signal triggered from an RFID reader (step 409). An update signal is a signal that includes an identifier that corresponds to a virtual asset as well as location information relative to a physical area. The identifier can be an RFID tag identifier associated with the virtual asset. The location information may be, for example, an RFID reader identifier, physical world coordinates, or other location information corresponding to a location, allowing for some error. Next, the virtual world server may determine an RFID tag, an RFID reader that read the tag, and an asset unique name corresponding to the RFID tag (step 411). Next, the virtual world server may look-up a virtual area that corresponds to the RFID reader identifier (step 413). Such information determined at step 413 may be derived from the update signal by referencing a database. The virtual world may teleport a virtual asset corresponding to the RFID tag identifier (step 415). The virtual world may condition teleporting the object based on a change in an assets location (as determined by a new RFID tag reader indicating a received RFID tag signal). Teleporting is an occurrence where a virtual asset or other object is removed from a rendering at a first location in the virtual world, and then the virtual asset is rendered to a second location. The relative distance between the first location and the second location can be a distance greater than gaps between frames of animation for a moving object. One practical implication of teleporting is that for an avatar at a location viewing an object, the object may seem to disappear. Similarly, an avatar at a location viewing the second location may be presented a view where the object spontaneously appears.

Next, the virtual world server may determine if the virtual asset is within viewing range of an avatar (step 423). An avatar is an object that represents a true-to-life or a fanciful depiction of a person. A virtual asset is a model of the asset to which the RFID tag is attached. The virtual asset may be rendered using voxels, surfaces or any other form of shading technique to mimic on a display screen the corresponding real-world object. Nevertheless, real-world status information may be applied to a virtual asset to apply coloring effects and distortions to signal a change in status for the physical asset. Real-world status information can be, for example, information regarding health of an asset, orientation of an asset, weight of an asset, age of an asset, or any other information that may be collected by human or automatic means. A determination that the virtual asset is not within a viewing range of an avatar may cause the virtual world server to obscure the virtual asset with respect to the avatar (step 425). Obscuring may include making the virtual asset disappear in a view on a user's client computer screen. Disappearing may be a consequence of the virtual asset moving in alignment with another object in the virtual world, wherein the object is between the applicable avatar and the virtual asset.

Thus, in response to a positive determination at step 423, the virtual world server may render the virtual asset in a corresponding virtual location relative to virtual landmarks and an avatar (step 427). The virtual world server may, show or otherwise identify an RFID tag identifier, RFID reader identifier, and an asset name in the view to the user (step 429).

A user may use a client to have an avatar interact with objects of the virtual world. For example, the user may cause the avatar to operate a virtual switch in the virtual world. Accordingly, the virtual world server may receive a user input to operate a controllable switch (step 431). A controllable switch is an active area in a view or other user interface with which an avatar may interact. The controllable switch may have accompanying code or scripts that define the manner in which the virtual world server will command elements in the physical world, such as, for example, assets in a dairy farm. In response to such an input, the virtual world server may transmit a command to a server (step 433). A command is an instruction that may be addressed to a particular networked device. The command may be received at the device to control a feature of the device. For example, a feature can be the toggling of current through a light bulb. The user input may be entered at a client computer and transmitted in a signal to the virtual world server. The input can include, for example, mouse movements, keystrokes, voice input, and the like. The command may be handled in the manner described in step 313 of FIG. 3B, above. Processing may terminate thereafter.

If multiple virtual assets are present in an area, the virtual assets may be arranged in a queue. For example, a first virtual asset may be rendered near a second virtual asset, based on a physics constraint of the virtual world. 'Near' may mean that the virtual assets are no farther from each other than the length of one of the virtual assets. Such an arrangement of virtual assets may be placed such that a group of virtual assets may be rendered as occupying locations, for example, along a perimeter of a circle, a length of a line, or ranked in a formation. Similarly, a physical asset that is detectable at two RFID readers may be rendered in the virtual world server such that a corresponding virtual asset is located between the corresponding virtual locations of the RFID readers. Such a location may correspond with boundary 251 of FIG. 2. Virtual assets that correspond to RFID tags that are known to be missing, or otherwise off-site of the physical area, may be not rendered within the virtual area.

A physics constraint of the virtual world is a property of an object that controls the manner in which real-world physics is simulated with respect to the object. For example, a physics constraint may be a formula to describe resiliency of a surface. Such a constraint may govern the degree to which a surface of an object may yield when a simulated forces are applied to the surface. Accordingly, numeric values may apply that may provide a spectrum of resiliency between rigid and flexible within such a formula. Thus, when two objects are in contact or move relative to each other, the data processing system that renders such objects may provide simulations of the objects to render realistic simulations of the movement and responsive recoil of each affected object.

It is appreciated that many additional physics constraints may apply, and that tangible, but invisible forces may be simulated to show flow of fluids, for example, fluids involved in filling a balloon. The physical forces, radiation and other aspects of the real world may be shown to affect objects to match to a greater or lesser degree, in accordance with predetermined physics constraints.

Status information may be applied to a rendered virtual asset. For example, a physical asset that is defective, may have corresponding computer instructions associated with the virtual asset to apply a visual effect to the virtual asset when shown rendered to a client computer. Such a visual effect can be applying a red filter or other adjustment to pixels rendered to a client computer.

Figure 5:
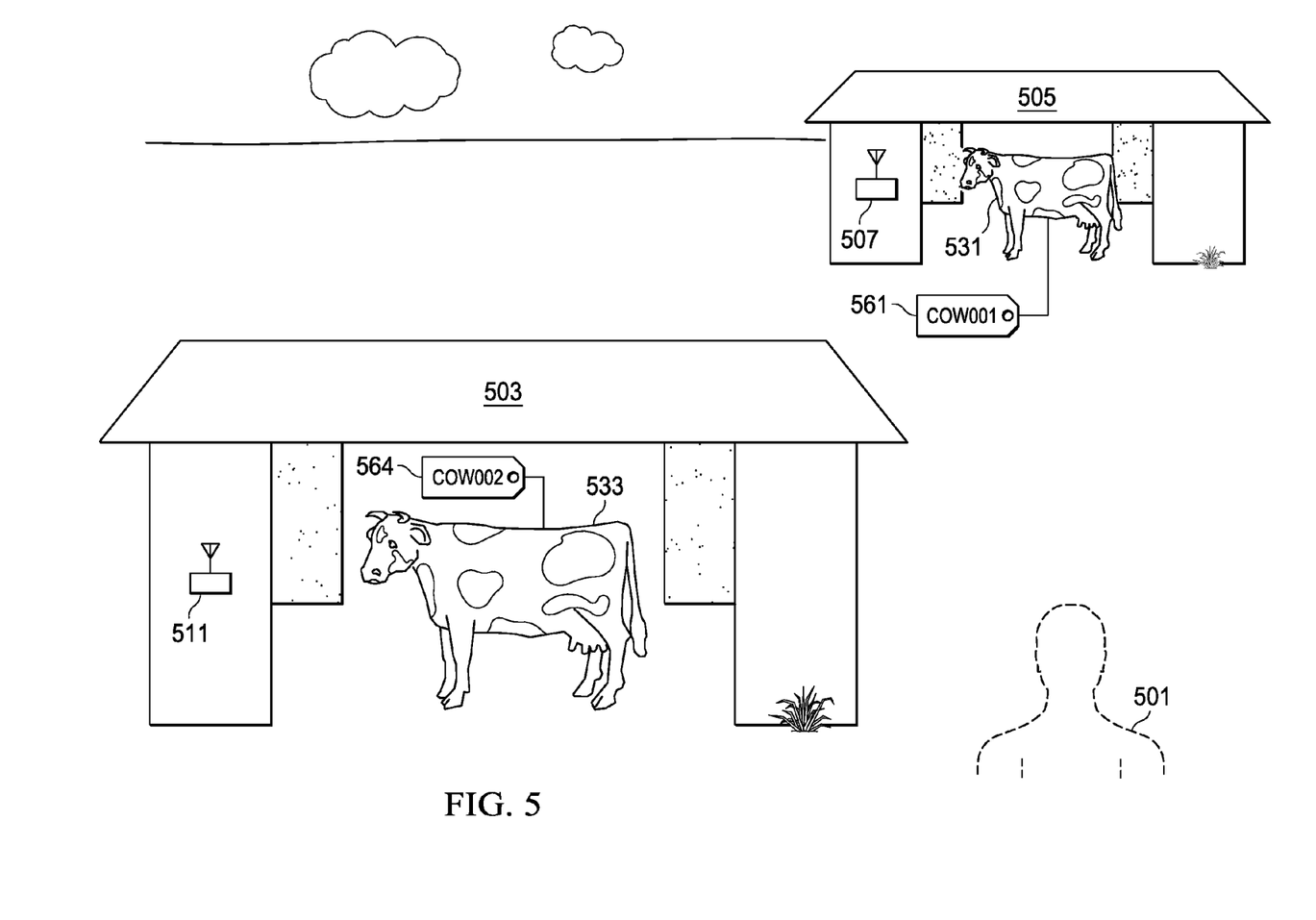
FIG. 5 is a rendering in a client in accordance with an illustrative embodiment of the invention.

FIG. 5 is a rendering in a client view in accordance with an illustrative embodiment of the invention. A client computer can be client computer 283 of FIG. 2. The client computer may rely on graphic processor 110 of FIG. 1 to provide a signal to a display, and accordingly present an image such as shown in FIG. 5 to a user. The client computer may communicate using http or other protocols with virtual world server. The virtual world server may provide details concerning a changing and dynamic view over using such protocols. Thus, a scene may include a perspective view of virtual landmarks and virtual assets. Manufactured objects can be shown as virtual object 503 and virtual object 505, which may be rendered views of data provided at step 401, above. Each virtual object can mimic a real-world view, in this case, of a shed. The photo-realism of such a view may vary according to a level of detail provided at step 401, a rendering capability and communication link of the client, among other influences. Thus, virtual object 505 may correspond, for example, to a zone 250 of coverage by an RFID reader 207 of FIG. 2. Similarly, virtual object 503 may correspond to zone 270 of coverage by an RFID reader 211.

As a result of receiving RFID tag identifiers, the RFID reader, server and virtual world server may estimate locations of livestock assets. For example, cow 533 can be rendered to appear to be within a virtual asset shed 503. Similarly, cow 531 can be rendered to appear to be in virtual asset shed 505. Cow 533 and cow 531 can appear respectively, near and far, in relation to avatar 501. Avatar 501 may be visibly rendered, for example showing a backside view of a person or other image adopted by a user. Alternatively, a virtual world server may render avatar 501 at varying levels of transparency, or even avoid rendering the avatar altogether.

Identifying markings may hover or otherwise be rendered near to an associated virtual asset. Thus, labels COW001 561 and COW002 564 can be shown near and directed to the virtual asset with which they are associated. More information may be placed within any graphic that surrounds the labels. For example, real-world status information may be rendered within such a graphic, including, for example, an age, a weight, among other things. In addition, the graphic can identify the RFID tag identifier of the asset. Furthermore, nearby RFID readers may be present as virtual objects, RFID reader 511 and RFID reader 507.

The virtual world server may render each virtual asset or other object of a scene by animating the image of such objects. For example, a virtual cow that is located at a shed, and then is located within a grazing area, may be animated to move as though by walking, from one location in the virtual world to the new location corresponding to the grazing area. The virtual world server may animate in other ways. For example, the virtual world server may cause an object periodically to be colored red to signal a condition or alert a user to a status. It can be appreciated, that many forms of animation are possible, and may provide some instructional value to students studying a subject. Animation can include showing the process by which a cow is milked or the manner in which a cow feeds. As can be appreciated, many animations are possible for a wide range of simulated or virtualized assets.

The illustrative embodiments permit a user to receive images that arrange virtual assets at least in a rough geometrical arrangement with landmarks and other objects in a virtual worldview. Such information may be widely available to users on one or more clients to track the progress and movement of a number of assets.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can contain or store the program for use by or in connection with the instruction execution system, apparatus, or device.

The computer-readable storage device can be an electronic, magnetic, optical, electromagnetic, infrared, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for representing a physical object in a virtual world, the method comprising:
    a computer receiving an update signal corresponding to an RFID tag, wherein a RFID tag is not in a line of sight of a RFID reader;
    the computer determining an RFID tag identifier, an RFID reader identifier, and an associated asset name from the update;
    the computer looking up a virtual area associated with the RFID reader identifier;
    the computer teleporting a virtual asset associated with the RFID tag identifier to the virtual area in the virtual world; and
    the computer rendering a virtual asset in the virtual world based on an avatar perspective, wherein the virtual asset is a model of the asset, wherein rendering further comprises rendering the RFID reader in the virtual area corresponding to the RFID reader in the virtual world based on an avatar perspective.

2. The computer implemented method of claim 1, further comprising:
    receiving a user input to operate a controllable switch; and
    transmitting a command to a server in response to receiving the user input.

3. The computer implemented method of claim 1, wherein rendering further comprises rendering real-world status information.

4. The computer implemented method of claim 1, wherein rendering further comprises queuing the virtual asset near a second virtual asset, based on a physics constraint of the virtual world.

5. The computer implemented method of claim 4, wherein queueing further comprises arranging the virtual asset apart from the second virtual asset up to a length of either the virtual asset or the second virtual asset.

6. The computer implemented method of claim 1, wherein rendering further comprises:
    animating one selected from the group including the asset, the avatar, a second asset.

7. The computer implemented method of claim 1, wherein receiving the update signal comprises receiving a signal from a server coupled to the RFID reader.

8. A computer program product for representing a physical object in a virtual world, the computer program product comprising:
    one or more computer-readable, tangible storage devices;
    program instructions, stored on at least one of the one or more tangible storage devices, to receive an update signal corresponding to an RFID tag, wherein a RFID tag is not in a line of sight of a RFID reader;
    program instructions, stored on at least one of the one or more tangible storage devices, to determine an RFID tag identifier, an RFID reader identifier, and an associated asset name from the update;
    program instructions, stored on at least one of the one or more tangible storage devices, to look up a virtual area associated with the RFID reader identifier;
    program instructions, stored on at least one of the one or more tangible storage devices, to teleport a virtual asset associated with the RFID tag identifier to the virtual area in the virtual world; and
    program instructions, stored on at least one of the one or more tangible storage devices, to render a virtual asset in the virtual world based on an avatar perspective, wherein the virtual asset is a model of the asset, and
        wherein rendering further comprises rendering the RFID reader in the virtual area corresponding to the RFID reader in the virtual world based on an avatar perspective.

9. The computer program product of claim 8, further comprising:
    program instructions, stored on at least one of the one or more tangible storage devices, to receive a user input to operate a controllable switch; and
    program instructions, stored on at least one of the one or more tangible storage devices, to transmit a command to a server in response to receiving the user input.

10. The computer program product of claim 8, wherein program instructions, stored on at least one of the one or more tangible storage devices to render further comprises program instructions, stored on at least one of the one or more tangible storage devices to render real-world status information.

11. The computer program product of claim 8, wherein program instructions, stored on at least one of the one or more tangible storage devices to render further comprises program instructions, stored on at least one of the one or more tangible storage devices to queue the virtual asset near a second virtual asset, based on a physics constraint of the virtual world.

12. The computer program product of claim 11, further comprising:
    program instructions, stored on at least one of the one or more tangible storage devices, to arrange the virtual asset apart from the second virtual asset up to a length of either the virtual asset or the second virtual asset.

13. The computer program product of claim 8, wherein program instructions, stored on at least one of the one or more tangible storage devices to render further comprises program instructions, stored on at least one of the one or more tangible storage devices to animate one selected from the group including the asset, the avatar, a second asset.

14. The computer program product of claim 8, wherein program instructions, stored on at least one of the one or more tangible storage devices to receive the update signal comprises program instructions, stored on at least one of the one or more tangible storage devices to receive a signal from a server coupled to the RFID reader.

15. A data processing system comprising:
    a bus;

a storage device connected to the bus, wherein computer usable code is located in the storage device;

a communication unit connected to the bus;

a processing unit connected to the bus, wherein the processing unit executes the computer usable code for representing a physical object in a virtual world, wherein the processing unit executes the computer usable program code to receive an update signal corresponding to an RFID tag, wherein a RFID tag is not in a line of sight of a RFID reader; determine an RFID tag identifier, an RFID reader identifier, and an associated asset name from the update; look up a virtual area associated with the RFID reader identifier; teleport a virtual asset associated with the RFID tag identifier to the virtual area in the virtual world; and render a virtual asset in the virtual world based on an avatar perspective, wherein the virtual asset is a model of the asset, and wherein rendering further comprises rendering the RFID reader in the virtual area corresponding to the RFID reader in the virtual world based on an avatar perspective.

16. The data processing system claim 15, wherein the processor further executes computer usable program code to receive a user input to operate a controllable switch and transmit a command to a server in response to receiving the user input.

17. The data processing system claim 15, wherein in executing computer usable program code to render, the processor further executes computer usable program code to render real-world status information.

18. The data processing system claim 15, wherein in executing computer usable program code to render, the processor further executes computer usable program code to queue the virtual asset near a second virtual asset, based on a physics constraint of the virtual world.

19. The data processing system claim of claim 18, wherein in executing computer usable program code to queue, the processor further executes computer usable program code to arrange the virtual asset apart from the second virtual asset up to a length of either the virtual asset or the second virtual asset.

20. The data processing system claim 15, wherein in executing computer usable program code to render, the processor further executes computer usable program code to animate one selected from the group including the asset, the avatar, a second asset.

* * * * *